(12) United States Patent
Priesgen

(10) Patent No.: US 7,147,417 B2
(45) Date of Patent: Dec. 12, 2006

(54) SLIDE MECHANISM

(75) Inventor: Anthony P. Priesgen, Hartford, WI (US)

(73) Assignee: Triton Corporation, Hartford, WI (US)

( * ) Notice: Subject to any disclaimer, the term of this patent is extended or adjusted under 35 U.S.C. 154(b) by 0 days.

(21) Appl. No.: 10/811,175

(22) Filed: Mar. 26, 2004

(65) Prior Publication Data
US 2005/0214093 A1    Sep. 29, 2005

(51) Int. Cl.
B61D 45/00    (2006.01)

(52) U.S. Cl. .................................................. 410/104

(58) Field of Classification Search ................ 410/101, 410/104, 105, 106, 116; 24/265 CD, 115 K; 248/499
See application file for complete search history.

(56) References Cited

U.S. PATENT DOCUMENTS

| | | | |
|---|---|---|---|
| 1,733,269 A | 10/1929 | Mauk et al. | |
| 2,676,680 A | 4/1954 | Kindorf | |
| 2,688,289 A | 9/1954 | Sterling | |
| 2,696,139 A | 12/1954 | Attwood | |
| 2,736,272 A | 2/1956 | Elsner | |
| 3,053,355 A | 9/1962 | Attwood | |
| 3,877,671 A | 4/1975 | Underwood et al. | |
| 4,106,252 A * | 8/1978 | Rutten ............................ | 52/82 |
| 4,161,303 A | 7/1979 | Bachand | |
| 4,248,558 A | 2/1981 | Lechner | |
| 4,269,340 A | 5/1981 | Kowalski et al. | |
| 4,450,655 A | 5/1984 | Rosenthal et al. | |
| 4,575,295 A | 3/1986 | Rebentisch | |
| 4,717,298 A | 1/1988 | Bott | |
| 4,778,092 A | 10/1988 | Grace | |
| 4,784,552 A | 11/1988 | Rebentisch | |
| 4,955,771 A | 9/1990 | Bott | |
| 4,969,784 A * | 11/1990 | Yanke ......................... | 410/104 |
| 5,154,385 A | 10/1992 | Lindberg et al. | |
| 5,178,346 A | 1/1993 | Beroth | |
| 5,259,711 A | 11/1993 | Beck | |
| 5,393,114 A * | 2/1995 | Christensen ................. | 296/36 |
| 5,409,335 A * | 4/1995 | Beck .......................... | 410/105 |
| 5,421,612 A | 6/1995 | Floe | |
| 5,538,308 A | 7/1996 | Floe | |
| 5,738,379 A | 4/1998 | Floe | |
| 5,775,711 A | 7/1998 | Floe | |
| 5,823,559 A | 10/1998 | Priesgen et al. | |
| 5,921,603 A * | 7/1999 | Karrer ........................ | 296/39.2 |
| 6,030,159 A * | 2/2000 | Herrick et al. .............. | 410/102 |
| 6,068,282 A | 5/2000 | Floe | |
| 6,131,866 A | 10/2000 | Kesinger | |
| 6,142,718 A * | 11/2000 | Kroll .......................... | 410/106 |
| 6,164,882 A | 12/2000 | Selle | |

(Continued)

*Primary Examiner*—H Gutman
(74) *Attorney, Agent, or Firm*—Boyle Frederickson Newholm Stein & Gratz S.C.

(57) ABSTRACT

A trailer is configured with a slide mechanism operable to slidably couple a tie-down assembly with the trailer. The trailer includes a trailer frame configured with an axle and a pair of wheels for transporting a load over a distance. The slide mechanism includes an elongated member having a slot extending an axial length of the elongated member. The slide mechanism further includes a channel disposed parallel to and in communication with the slot. The channel has a width that exceeds the gap width of the slot. The slide mechanism further includes a carriage bolt and a tightening nut. The channel is configured to maintain the head of the carriage bolt adjacent to the slot. The carriage bolt and tightening nut slidably couple the tie-down assembly to the trailer frame.

20 Claims, 8 Drawing Sheets

U.S. PATENT DOCUMENTS

| | | | |
|---|---|---|---|
| 6,213,696 B1 * | 4/2001 | Austin | 410/106 |
| 6,247,719 B1 * | 6/2001 | Youmans et al. | 280/414.1 |
| 6,439,814 B1 | 8/2002 | Floe | |
| 6,536,992 B1 | 3/2003 | Floe | |
| 6,543,974 B1 | 4/2003 | Floe | |
| 6,547,474 B1 * | 4/2003 | Smetz | 403/78 |
| 6,616,388 B1 | 9/2003 | Floe | |
| 6,712,568 B1 * | 3/2004 | Snyder et al. | 410/104 |
| 6,769,847 B1 * | 8/2004 | Heilmann | 410/104 |
| 2004/0253071 A1 * | 12/2004 | Floe | 410/3 |
| 2005/0194330 A1 * | 9/2005 | Ziske | 211/59.1 |

* cited by examiner

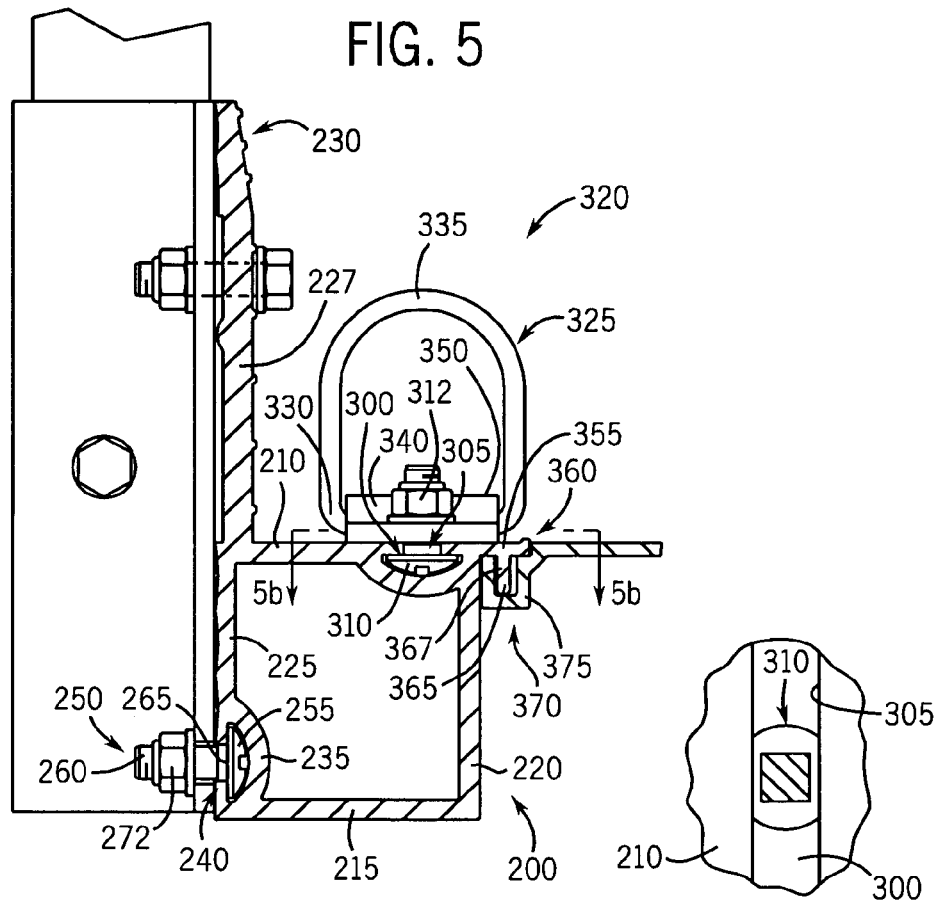
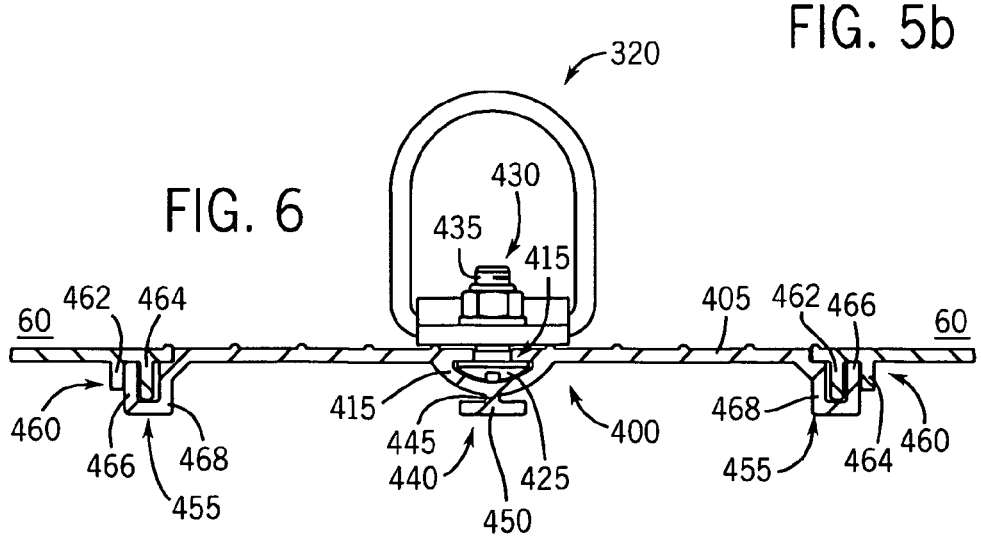

SLIDE MECHANISM

FIELD OF THE INVENTION

This invention relates generally to trailers, and in particular, to a trailer configured to accommodate various sizes of loads.

BACKGROUND OF THE INVENTION

Typically, trailers are used to transport predetermined types of loads (e.g., watercraft, all-terrain vehicles, etc.) over a distance. One class of trailers is light-weight, generally has a deck and various other parts supported on two wheels. The trailers further include ramps and tilt beds known and used for loading the trailer.

The loads are typically recreational vehicles that come in various shapes, forms, and sizes. For example, an all-terrain vehicle (ATV) generally has four-wheels that rest on a flat deck. In contrast, a watercraft typically includes a rounded hull that is supported on carpeted bunkers mounted on the trailer. Generally, the construction of a known trailer assembly is designed for the particular type of load, and is less amenable to transporting other types of loads.

As an example, a trailer for a watercraft is disclosed in U.S. Pat. No. 5,823,559, hereby incorporated by reference in its entirety herein. The trailer includes multiple sliding support elements configured to receive bunk elements attached to a frame structure. The sliding support elements include a carriage bolt slidably adjustable along a slot in an elongated, hollow member. The support elements are configured to receive various types of watercraft (e.g., jet skis, pontoon boats, etc.). In contrast, U.S. Pat. No. 6,439,814 discloses a transport bed for use with snowmobile trailers. The sides of the snowmobile trailer include stakeholders mounted at fixed positions. The transport bed includes a main bold channel with a pair of telescoping end channels. The tie-down mechanisms can further include an elongated bolt extending through the main channel. The bolt includes a cam mechanism at one end extending out from underneath the main channel, and a clamping handle and retention nut at the other upward extending end.

However, known trailer assemblies have several drawbacks. The telescoping tie-down assembly is cumbersome to install, unreliable, and limited in its adjustability. Other known tie-down assemblies that have a bolt slidable along a slot in a hollow elongated member are more adjustable, but are still cumbersome to move and utilize. Specifically, the carriage bolts are difficult to insert and adjust along the slot. The bolt only inserts at the extreme ends of the elongated channel. Furthermore, the coupling of the head of the carriage bolt against the edges defining the slot does not provide a reliably secure hold of the tie-down assembly. Still furthermore, the dimensions and related strength of the hollow elongated members are limited by the length of the carriage bolt. The reason being, as the head portion of the carriage bolt rests on the bottom portion of the hollow member, a minimal length of the threaded neck of the carriage bolt is needed to extend through the slot in order for an operator to grasp and adjust its position along the slot. This is even more cumbersome with coupling various sizes of tie-down assembly elements.

Therefore, it is a primary object and feature of the present invention to provide a trailer with a slide mechanism that may be adapted for use with various sizes and configurations of support members and/or tie-down assemblies.

It is a further object and feature of the present invention to provide a trailer configured with a slide mechanism adapted to accommodate various types and configurations of tie-down assemblies for variable configurations of loads for transport.

SUMMARY OF THE INVENTION

In accordance with the present invention, a slide mechanism is provided for a trailer assembly to accommodate the transport of various sizes of recreational vehicles (e.g., all-terrain vehicles, snowmobiles, watercraft, etc.) and/or various other loads over a distance. The present invention provides the ability to.

In one embodiment, the invention provides a slide mechanism for mounting a tie-down assembly on a trailer. The slide mechanism includes an elongated member having a slot extending the axial length of the elongated member. The elongated member also includes a channel disposed parallel to and in communication with the slot. The width of the channel exceeds the gap width of the slot. The slide mechanism further includes a carriage bolt having a head and an elongated neck. The head has a width exceeding the gap width of the slot. The channel is configured to maintain the carriage bolt head adjacent to the slot. The carriage bolt neck is configured to couple the tie-down assembly to the slide mechanism.

In another embodiment, the invention provides a trailer assembly that includes a trailer frame for transporting a load. The trailer frame is supported on an axle and a pair of wheels. The trailer frame include a tie-down assembly configured to secure a load, and a slide mechanism configured to slidably couple the tie-down assembly to the trailer frame. The slide mechanism includes an elongated member having a slot and a channel. The slot extends the axial length of the elongated member and has a gap width. The channel is disposed in communication with the slot, and has a width that exceeds the gap width of the slot. The slide mechanism further includes a carriage bolt having a head with a width exceeding the gap width of the slot. The channel is configured to maintain the carriage bolt head adjacent to the slot, and the carriage bolt is configured to receive the tie-down assembly.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

FIG. 5 is a cross-sectional view of the slide mechanism of the present invention taken along line 5—5 of FIG. 5;

FIG. 5b is a cross-sectional view of a portion of the slide mechanism of the present invention taken along line 5b—5b of FIG. 5;

FIG. 6 is a detailed perspective view of a second embodiment of a slide mechanism in accordance with the present invention;

FIG. 14 is a cross-sectional view of the trailer taken along line 14—14 of FIG. 11;

DETAILED DESCRIPTION OF THE DRAWINGS

Figure 1:
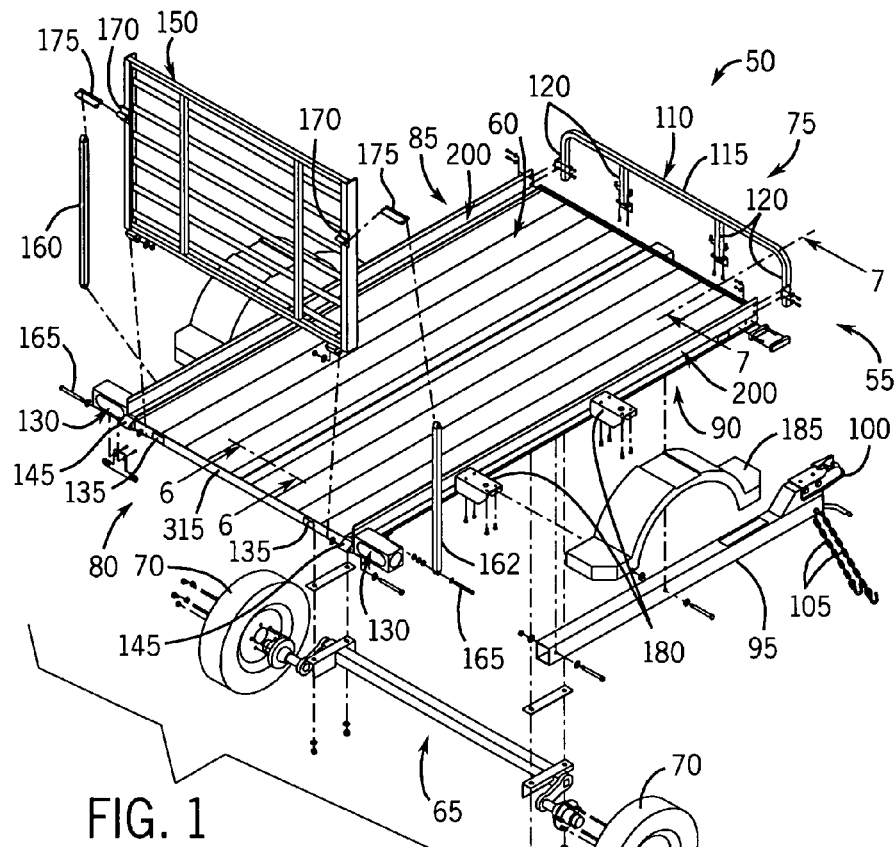
FIG. 1 is an exploded perspective view of a trailer assembly in accordance with the present invention.

FIG. 1 shows a perspective view of a trailer assembly 50 in accordance with the present invention. The trailer assembly 50 generally includes a trailer frame structure 55 having a deck 60 configured to support a load (not shown). The trailer frame structure 55 is supported by an axle assembly 65 mounted on a pair of wheels 70. The length of the trailer assembly 50 and the number of axles and associated wheels can vary.

The trailer assembly 50 shown in FIG. 1 is adapted to transport a snowmobile. Yet, the invention is not limited to the transport of snowmobiles. The types of loads transported by the trailer assembly can vary. For example, the trailer assembly can be modified with various tie-down assemblies to support the transport of watercraft (e.g., pontoon boat, jet skis, etc.), all-terrain vehicles (ATVs), motorcycles, or other known recreational vehicles over a distance. The type of load can vary from a recreational vehicle as well and is not limiting on the invention.

The trailer frame structure 55 generally has a front 75 and a rear portion 80 and a pair of side portions 85 and 90. The front portion 75 includes an elongated central frame member 95 or telescoping member having a first forward end with a cup-shaped receiver 100 configured to receive a conventional ball or other type of hitch assembly of a towing vehicle (not shown). In addition, a pair of chains 105 extends from the forward end of the central frame member 95 to further secure the trailer assembly 50 to the towing vehicle. The front portion 75 of the trailer assembly 50 can further include a front rail assembly 110 mounted to the trailer frame structure 55. The front rail assembly 110 can be an integrated assembly that includes a horizontal member 115, a series of vertically extending members 120, and mounting plates 125 configured to receive to the trailer frame structure 55.

The rear portion 80 of the trailer frame structure 55 includes tail-lights 130 and reflectors 135 mounted on a rear support member 140. The rear portion 80 further includes a pair of integrated hinge assemblies 145 configured to pivotally support a ramp assembly 150. The ramp assembly 150 is configured to enhance loading various recreational vehicles or other loads onto the deck of the trailer assembly for transport. The ramp assembly 150 generally includes ramp 155 pivotable about the hinge assemblies 145 between a raised or stowed position (See FIG. 1) for transport and a lowered position (not shown) for loading. The ramp assembly 150 can also includes a pair of stowage arms 160 and 162 disposed on each side of the ramp assembly 150 configured to hold the ramp assembly 150 in the raised or stowed position. One end of the stowage arms 160 and 162 includes an opening to receive a pin 165 coupling the stowage arm 160 and 162 to the trailer assembly 50. The ramp assembly 150 also includes a pair of ramp couplings 170 mounted along the side and partially towards the free end of the ramp 155. The ramp couplings 170 and openings at the other end of the support arms 160 and 162 are configured to receive another pin 175 to hold the ramp 155 in the raised or stowed position.

Extending between the side portions 85 and 90 of the trailer frame structure 55 are cross-members 180. The cross-members 180 are configured to support a wheel fender 185. The wheel fender 185 partially encloses the wheels 70 of the trailer assembly 50.

As shown in FIGS. 1–5, along each side portion 85 and 90 extends a slide mechanism 200 of the present invention. The slide mechanism 200 includes an elongated member that extends horizontally and longitudinally between the front portion 75 and the rear portion 80 of the frame structure 55. The elongated member includes a top plate 210, a bottom plate 215, a first side plate 220 and a second side plate 225 integrated and configured into a generally rectangular shaped, hollow member. A rail member 227 extends vertically from the second side plate 225. The rail member 227 includes a free end having a tapered portion 230. The rail member 227 provides, among other things, a retaining and supportive structure that is also aesthetically pleasing.

Figure 3:
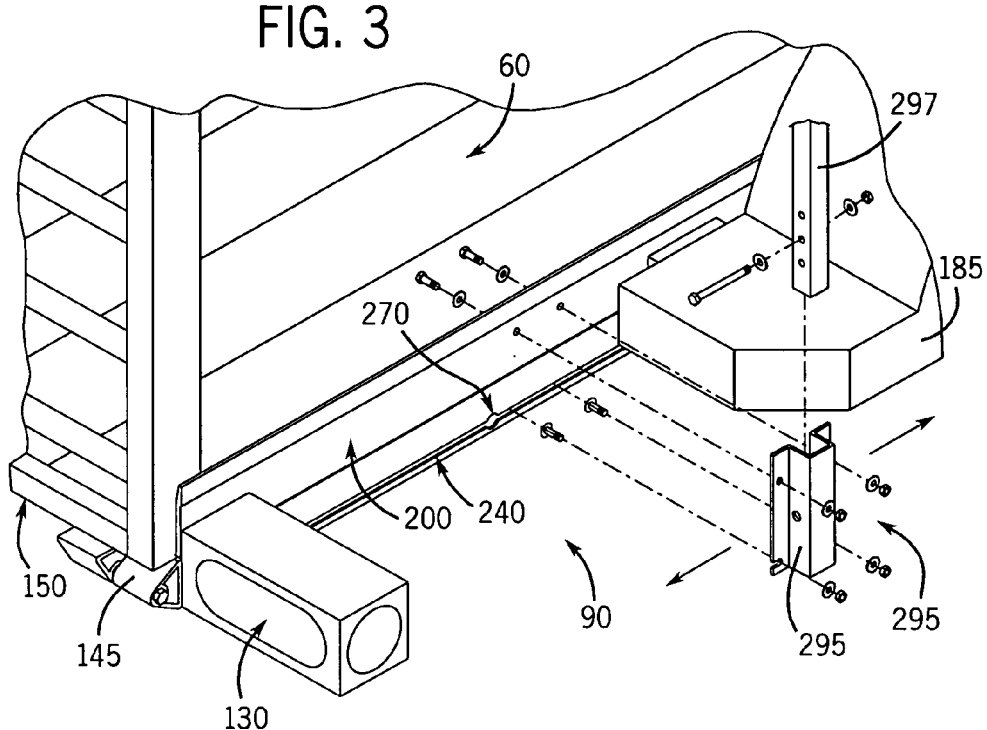
FIG. 3 is a detailed perspective view of a slidable post mount assembly in accordance with the present invention.

Referring to FIGS. 3 and 5, disposed along the interior surface of the second side plate 225 is a first channel 235 that extends the length of the side rail member 205. The second side plate 225 further includes a first slot 240 aligned and in communication with the first channel 235 for the length of the side rail member 205.

As shown in FIG. 5, the channel 235 and slot 240 are configured to receive a carriage bolt 250. The carriage bolt 250 generally includes a head 255, a neck or shaft 260, and a guide portion 265 therebetween. The guide portion 265 has a generally square cross-sectional shape. The slot 240 includes one or more expanded openings 270 configured to receive the head 255 of a carriage bolt 250. The channel 235 is generally shaped to conform to the shape of the head of the carriage bolt. As shown in FIG. 5, the channel includes a curved shaped and is generally as wide and deep as the diameter and depth of the head of the carriage bolt, respectively. The guide portion 265 of the carriage bolt 250 is of a depth generally the same as the thickness as the depth of the slot 240. The channel 235 and the slot 240 are thereby configured to support or maintain the head 255 of the carriage bolt 250 adjacent to the slot 240, while the guide portion 265 extends through the slot 240 and the neck 260 extends beyond the slot for coupling to a tie-down assembly (discussed later). The neck 260 includes a threaded external portion configured to receive a threaded internal portion of a tightening nut 272. The configuration of the channel 235 and the slot 240 allow the bolt 250 to slide move along the length of the elongated member. The conforming shape of the channel 235 to the head 255 of the carriage bolt 250 enhances the supportive reliability of the slide mechanism 200 while maintaining its adjustability. The shape (e.g., square, rounded, etc.) of the carriage bolt head 255 and channel 235 can vary.

Figure 2:
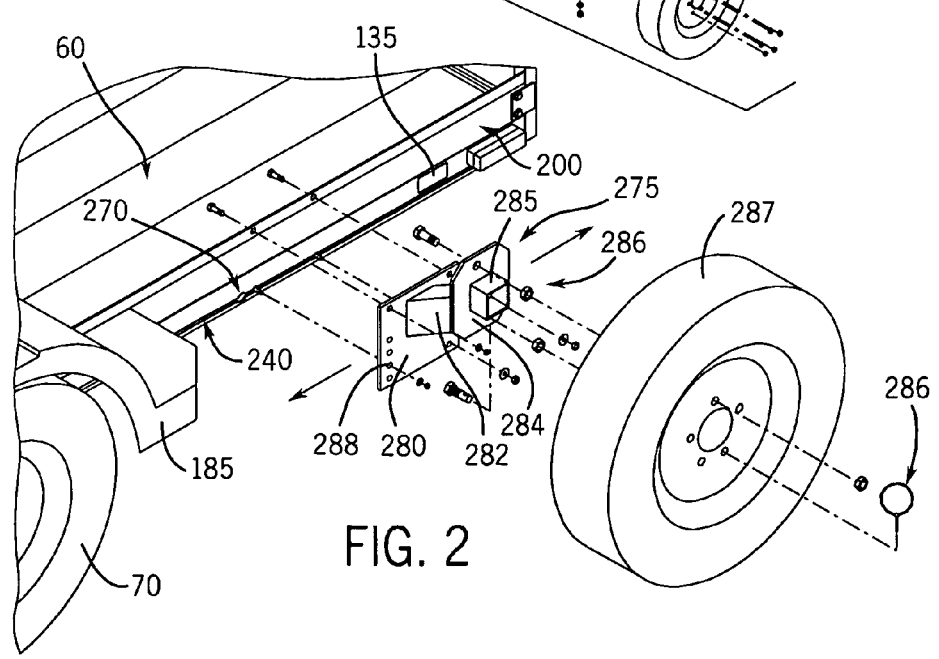
FIG. 2 is a detailed view of the spare tire assembly configured to mount to the trailer assembly shown in FIG. 1.

In FIG. 2, the sliding assembly 200 is used to couple or mount a tie-down assembly 275 of the present invention along the side portion of the trailer assembly. The tie-down assembly 275 includes a spare tire mount 280 coupled by a leg 282 to an extended bracket 284. The bracket 284 includes a square shaped extension 285 configured with fasteners or pin 286 to couple a spare tire 287 to the bracket 284. The communication of the bolt 250 in the channel 235 and slot 240 allow sliding movement of the spare tire mount 280 and attached tire 285 to a desired position, and the tightening nut and washer secures the spare tire 285 at the desired position. The mount 280 further includes a plurality of vertically aligned openings 288 configured to allow vertical adjustment of the spare tire 286 relative to the slide mechanism 200.

FIG. 3 shows the sliding assembly 200 coupled to another tie-down assembly 290 of the present invention. The tie-down assembly 290 includes a post mount 295 configured to receive a post 297 and a coupling pin 298. Additional openings can be made through the elongated member of the slide mechanism 200 to receive additional fasteners to further secure the tie-down assemblies 275 and 290 described above at the desired positions. Still referring to FIG. 3, the slide mechanism can also slidably support the tail-light assembly 130. The channel 235 and slot 240 can receive a plurality of carriage bolts 250 for simultaneously coupling a plurality of tie-down assemblies and other miscellaneous tie-down or side mount kit assemblies known in the art. The number of carriage bolts in support of a tie-down assembly or tie-down assembly can vary.

The slide mechanism 200 shown in FIG. 5 can further include a second channel 300 in communication with a second slot 305 disposed on the top plate 210, similar to the first channel 235 and slot 240 described above. The channel 300 and slot 305 are configured to maintain a carriage bolt 310 and nut 312 in a vertical alignment while allowing the carriage bolt 310 to slide along the length of the channel 300 and slot 305 and the side portions 85 and 90 of the trailer frame structure 55.

Figure 4:
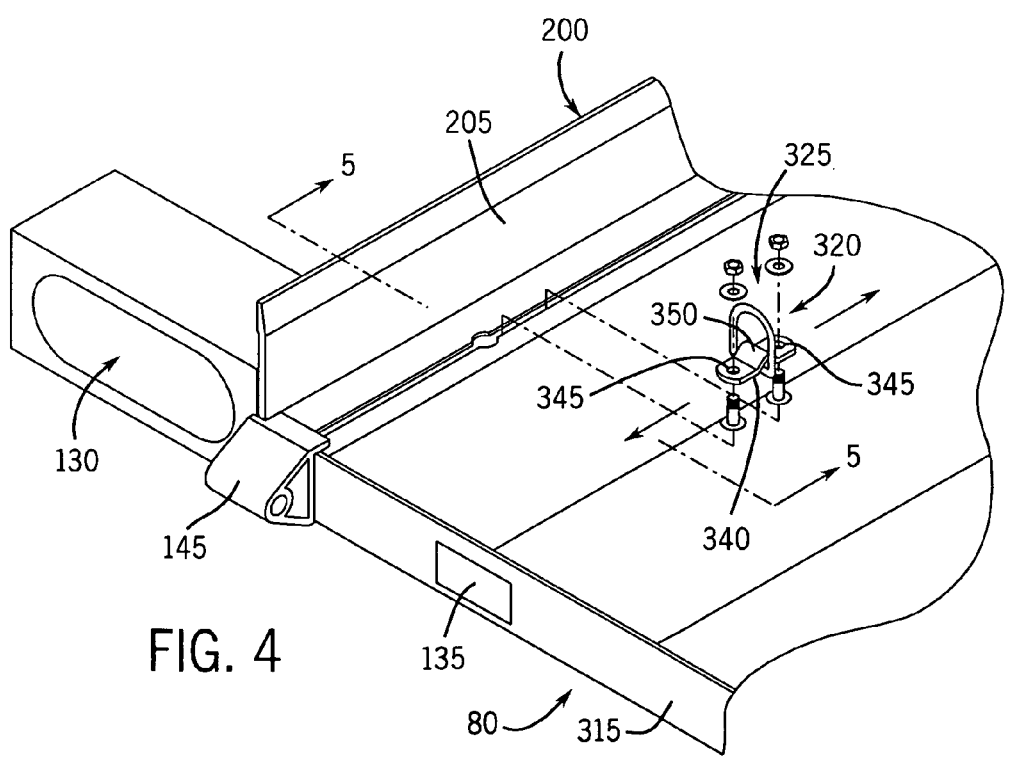
FIG. 4 is a detailed perspective view of a first embodiment of a slide mechanism in accordance with the present invention.

Referring to FIGS. 1 and 4, an endplate 315 can mounted on the end of the slide mechanism 200, as well as the rear portion 80 of the trailer frame structure 55. The hinge assembly 145 in support of the ramp assembly 150 is mounted on the endplate 315 and is aligned with the slide mechanism 200.

FIGS. 4 and 5 show another embodiment of a tie-down assembly 320 of the present invention coupled to the slide mechanism 200 by the carriage bolts 310 and nuts 312 disposed in the second channel 300 and slot 305. The tie-down assembly 320 includes a ring 325 have a generally linear base portion 330 integrated with a generally U-shaped portion 335. The tie-down assembly 320 further includes a mounting bracket 340 having a pair of openings 345 configured to receive the carriage bolts 310 of the slide mechanism 200. The bracket 340 also includes a raised central portion 350 configured to receive the base portion 330 of the ring 325 against the surface of the top plate 210 of the slide mechanism 200. An operator can partially tighten the nut 312 and miscellaneous washers down on the bracket 340 to couple the tie-down assembly 320 to the slide mechanism 200. Thereby, the tie-down assembly 320 can slidably move along the channel of the slide mechanism to a desired location. To secure the tie-down assembly 320 at the desired position, the tightening nut 312 can be further threaded downward on the carriage bolt 310. Thereby, this configuration provides a reliable anchor that is slidably adjustable to a desired position on the trailer assembly 50.

As shown in FIG. 5, the top plate 210 of the slide mechanism 200 can further include an overhang portion 355 that extends beyond the first side plate 220. The outer edge of the overhang portion 355 includes a male adapter 360. The male adapter 360 includes a lip 365 extending downwardly from the overhang portion 355. The male adapter 360 is configured couple or mate with a U-shaped channel 367 of a female adapter or receiver 370 disposed along the outer edge 375 of an adjacent member (e.g., deck 60). The male adapter 360 and female adapter 370 are configured to provide a smooth transition from the slide mechanism 200 to the deck 60.

FIG. 6 shows another embodiment of a slide mechanism 400 of the present invention coupled to the tie-down assembly 320. The slide mechanism 400 is disposed co-planar with the deck 60 and is similar to the slide mechanism 200 described above. The slide mechanism 400 includes a plate member 405 that extends the longitudinal length of the deck 60. The plate member 405 includes a channel 415 and slot 420 that slidably retains a head 425 of a carriage bolt 430 such that a bolt neck 435 extends vertically from the surface of the plate member 405. The slide mechanism 400 further includes a base mount 440 to enhance reliable support of the tie-down assembly 320. The base mount 440 is generally T-shaped, having a vertical member 445 coupled at one end to the plate member 405 and the other end integrated with a horizontal member 450. The ends of the plate member 405 include male adapters (not shown) or female adapters 455 configured to couple with respective male 460 or female adapters (not shown) disposed along the edge of the deck 60, similar to the male 360 and female 370 adapters described above. The male adapter 460 on the deck includes a first 462 and a second 464 downward extension or lip configured to receive an outer leg portion 466 of a female adapter's U-shaped channel 468.

Figure 7:
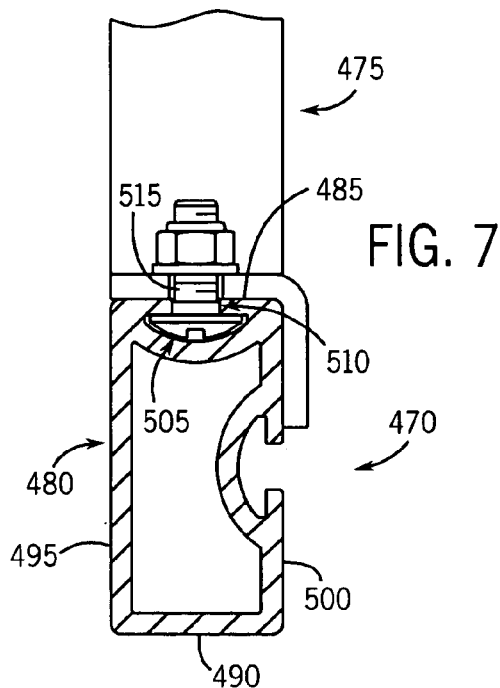
FIG. 7 is detailed perspective view of a third embodiment of a slide mechanism in accordance with the present invention.

FIG. 7 shows another embodiment of a slide mechanism 470 and a tie-down assembly 475 of the present invention. The slide mechanism 470 includes a generally rectangular shaped elongated member 480 having top 485 and a bottom 490 and a pair of sides 495 and 500. The top 485 of the rectangular shaped member 480 includes a first channel 505, a first slot 510, and a carriage bolt 515 similar to the slide mechanism 200 described above. The tie-down assembly 475 is coupled by the carriage bolt 515 and a nut 530 to the slide mechanism 470. The tie-down assembly 475 includes a generally L-shaped mount plate 535 with a pair of openings or slots 540 configured to receive the carriage bolt 515. The L-shaped mount plate 535 is integrated and/or coupled to a post 545. The post 545 can be a stand-alone vertical member or part of a frame or rail assembly e.g., the front rail assembly 110 (FIG. 1). The side 500 includes a second channel 520 and slot 525.

Figure 8:
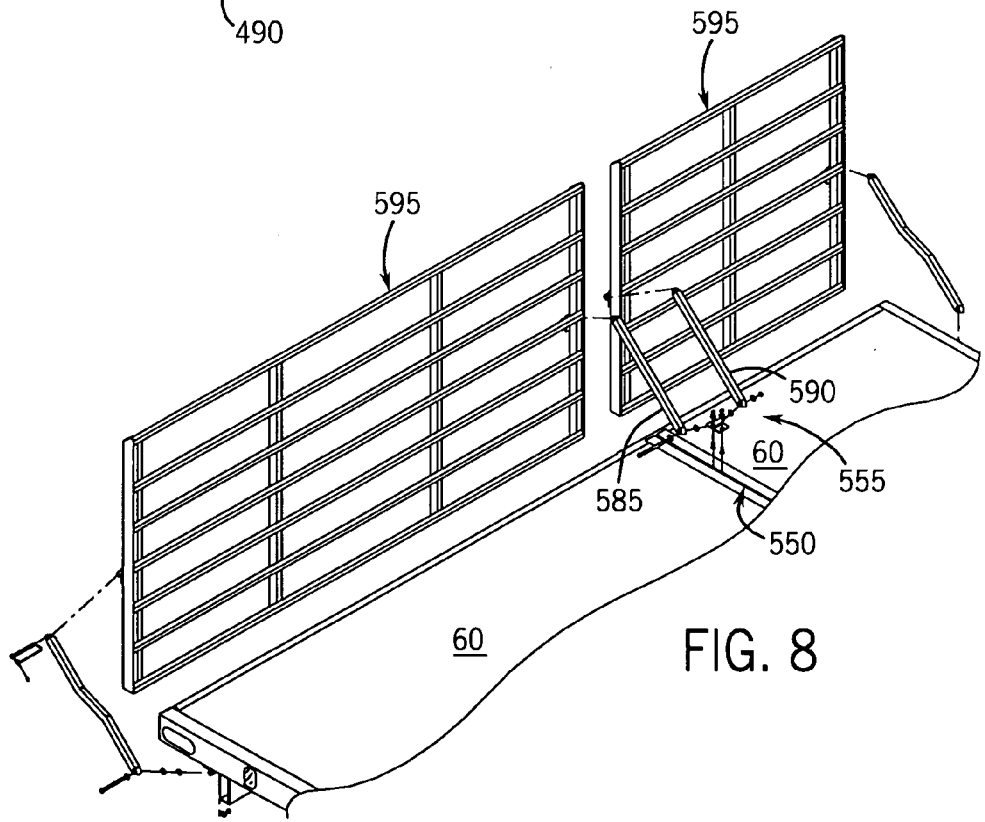
FIG. 8 is a detailed perspective view of an adjustable side rail assembly in accordance with the present invention.

FIG. 8 shows another embodiment of a slide mechanism 550 in slidable support of a tie-down assembly 555 of the present invention. The slide mechanism 550 is disposed laterally across the deck 60 of the trailer frame 55 from the first to the second side portion. The slide mechanism 550 includes a plate member 560 having a channel 565 in communication with a slot 570, and carriage bolts 572 similar to the slide mechanism 400 described above. The plate member 560 further includes raised tread portions 562 to enhance traction on the otherwise smooth surface. Coupled to opposite edges of the plate member 560 is an L-shaped support arm 575 configured to receive the deck 60 of the trailer frame structure 55. Integrated below the channel 565 is an extension 580 configured to enhance reliable support of the tie-down assembly 555.

The tie-down assembly 555 includes a pair of support arms 585 and 590 coupled at the one end to one or more frame assemblies 595. The frame assemblies 595 include a support structure having a plurality of coupled horizontal and vertically support members. The side frame assemblies 595 include a coupling 600 configured to pivotally couple with the end of the support arms 585 and 590 via a pivot pin (not shown). The other end of each support arm 585 and 590 is pivotally coupled to the slide mechanism 550. The number of support arms and couplings can vary. The composition (e.g., wood, metal, plastic, etc.) of the frame assembly 595 and the support arms 585 and 590 can vary.

The other end of each adjustable support arm 585 and 590 of the tie-down assembly 55 is coupled by a pin 605 to a bracket 610. The bracket 610 includes a bottom plate 615 configured to lie adjacent to the plate member 560 of the slide mechanism 550. The bottom plate 615 includes a pair of openings 620 (shown by hidden lines) align with the channel 565 and slot 570 and configured receive the extended carriage bolts 572. The bracket 610 further includes a cylindrical portion 625 coupled along its length with the bottom plate 615. The central axis of the cylindrical portion 625 extends orthogonally relative to the length of the channel 565 and slot 570. An opening 630 in the cylindrical portion 625 is configured to receive the pin 605 coupling the support arms 585 and 590 to the bracket 610. The pin 605 is coupled with a nut 635 and washers securing the pin 605 to the bracket 610. Upon slidably moving the tie-down assembly 555 along the slide mechanism 550 to a desired position, an operator can secure the position of the tie-down assembly 55 by tightening the bracket 610 of the tie-down assembly 555 down on the slide mechanism 550.

Figure 11:
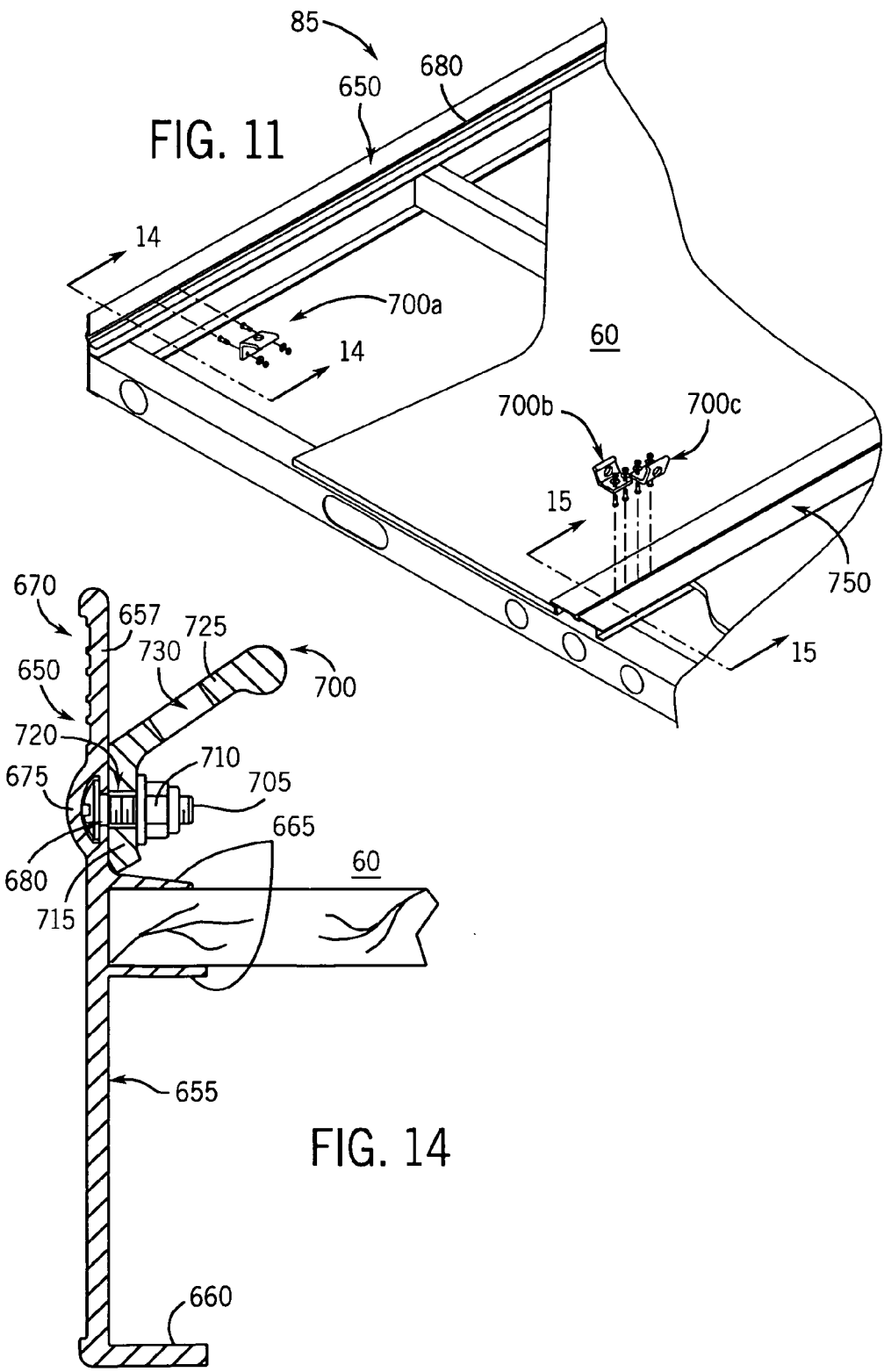
FIG. 11 is a detailed perspective view of an alternate embodiment of a trailer incorporating fourth and fifth embodiments of a slide mechanism in accordance with the present invention.
Figure 12:
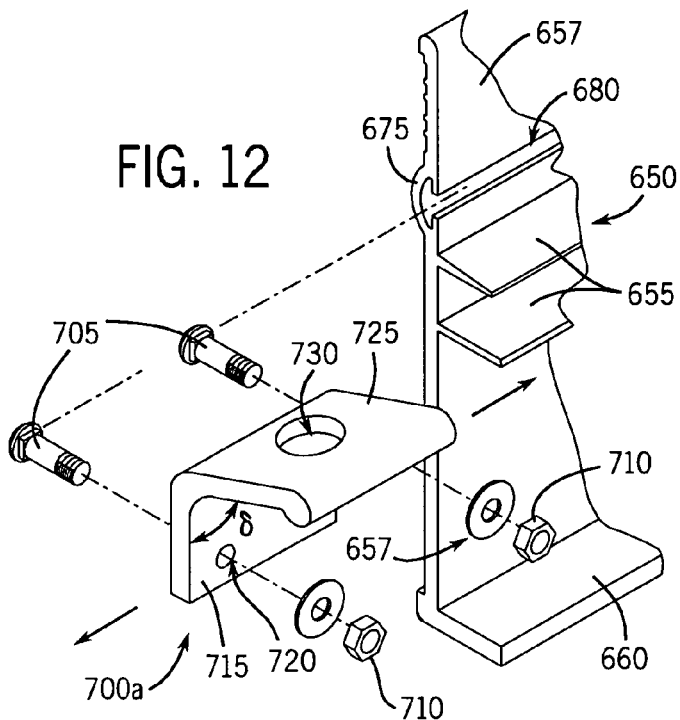
FIG. 12 is a detailed exploded view of the fourth embodiment of the slide mechanism shown in FIG. 11.

FIGS. 11, 12 and 14 show another embodiment of a slide mechanism 650 of the present invention. The slide mechanism 650 includes an L-shaped plate 655 configured to extend along the side portion 85 of the trailer 50. Another slide mechanism (not shown) disposed on the other side portion 90 of the trailer 50 would be a mirror image of the slide mechanism 650. The L-shaped plate 655 includes a vertical portion 657 and a base portion 660 and an intermediary region having a pair of extended lips 665 orthogonal to the vertical portion 657 of the plate 655. The extended lips 665 are configured to receive a member of the deck 60 of the trailer 50. The lower extended lip 665 and the base portion 660 are configured to receive a structural side frame member (not shown) of the trailer frame structure 55. The free end of the vertical portion 657 includes a plurality of treads 670 for aesthetic appearance. The slide mechanism 650 further includes a channel 675 in communication with a slot 680 disposed along the vertical portion of the plate 655, similar to the slide mechanism 400 described above. The channel 675 is integrated in the plate 655. Alternatively, a channel could be formed by another elongated member coupled to the L-shaped plate 655.

FIG. 11 also shows another embodiment of a tie-down assembly 700 of present invention. The tie-down assembly 700*a* is coupled to the slide mechanism 650 by a carriage bolt 705 and nut 710 similar to the tie-down assembly 555 described above. The tie-down assembly 700*a* includes a base plate 715 configured to lie adjacent the vertical portion 657 of the slide mechanism 650. The base plate 715 includes one or more openings 720 aligned with the channel 675 and slot 680 and configured to receive extended carriage bolt 705. The tie-down assembly 700*a* further includes an angled plate 725 coupled at an angle (δ) with respect to the base plate 715. The angle (δ) can vary. The angled plate 725 includes an opening 730 configured to receive a rope or chain or other means to secure a load in position on the trailer assembly 50. The outer edge of the angled plate 725 is rounded and thicker relative to the base plate 715 so as to enhance the strength and reduce wear on any rope or other miscellaneous fastening device (e.g., cord).

Figure 9:
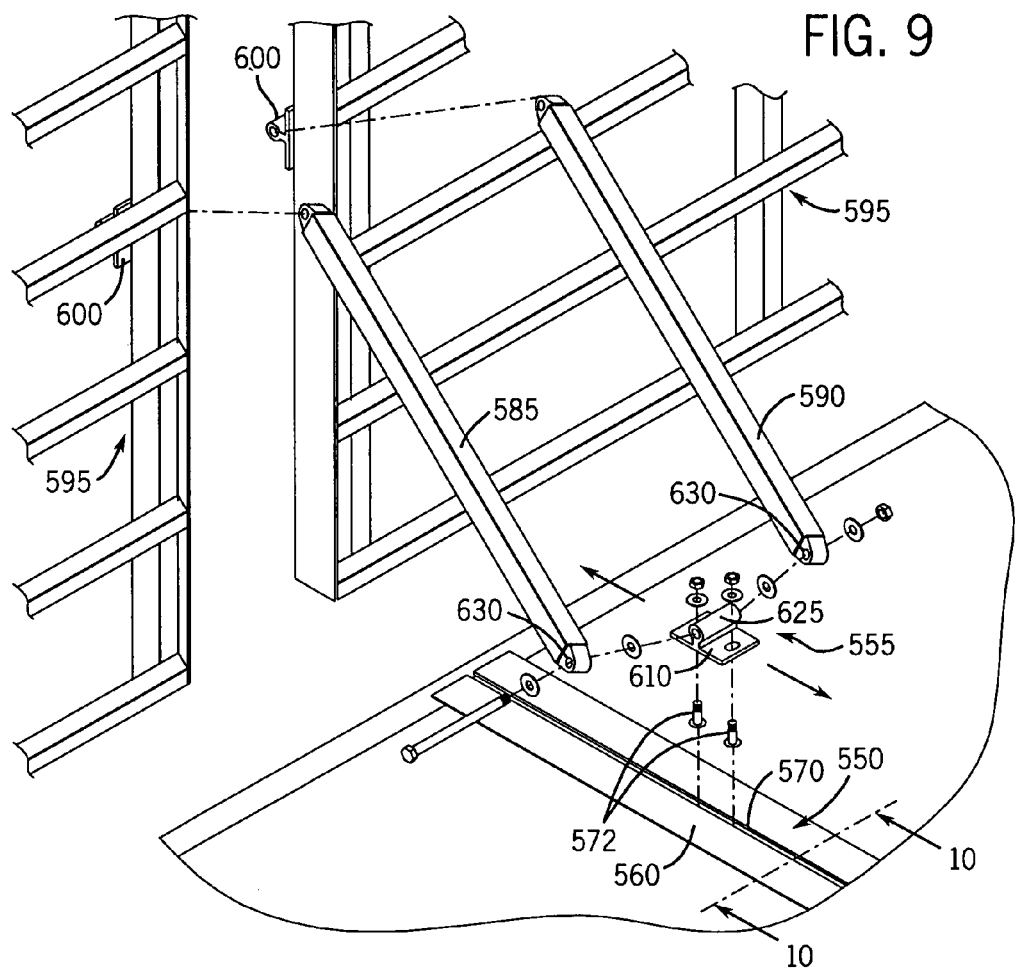
FIG. 9 is an enlarged perspective view of the adjustable side rail assembly shown in FIG. 8.
Figure 10:
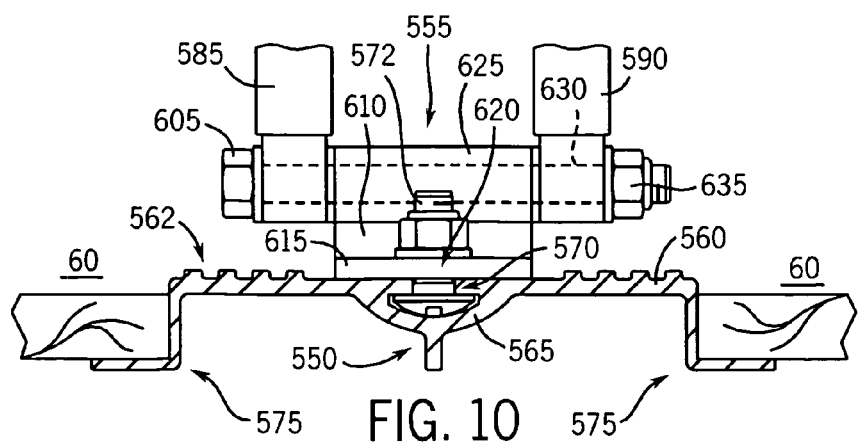
FIG. 10 is a cross sectional view taken along line 10—10 of FIG. 9.
Figure 13:
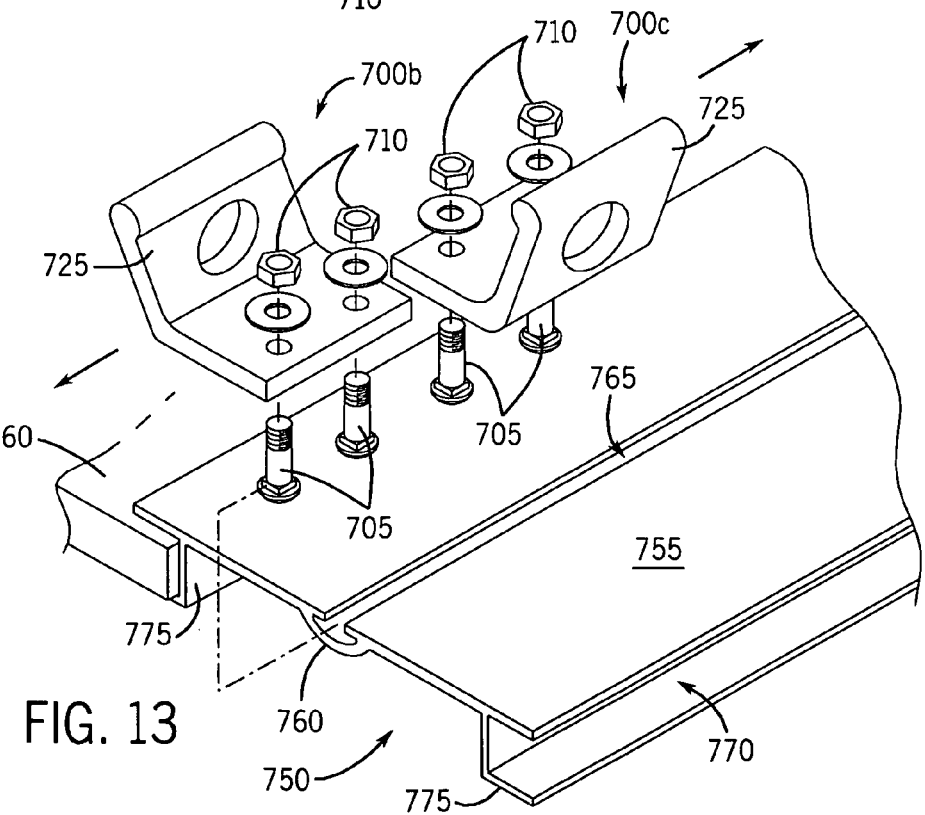
FIG. 13 is a detailed perspective view of the fifth embodiment of the slide mechanism shown in 11.
Figure 15:
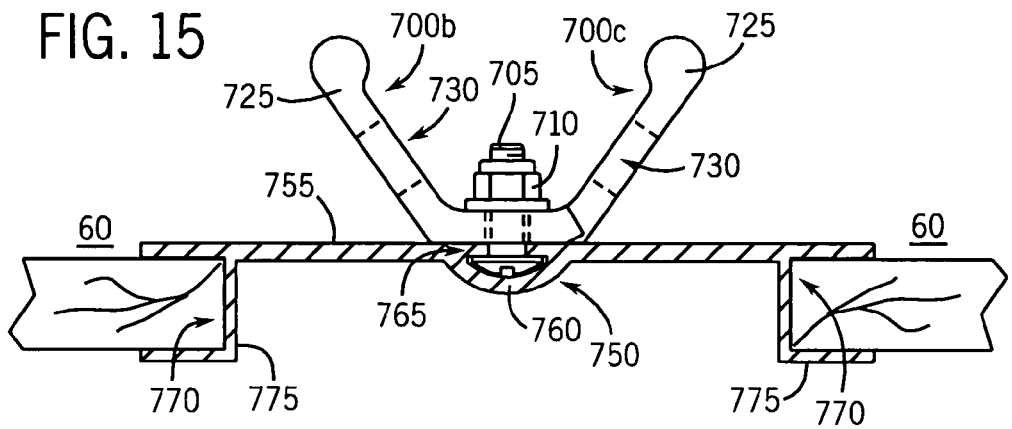
FIG. 15 is a cross-sectional view of the trailer taken along line 15—15 of FIG. 11.

FIGS. 11, 13 and 15 show the tie-down assemblies 700*b* and 700*c* coupled with a slide mechanism 750 of the present invention, similar to the slide mechanism 550 described in FIGS. 9 and 10. The slide mechanism 750 is disposed longitudinally and between the front 75 and rear 80 portions of the trailer assembly 50. The slide mechanism 750 includes a plate member 755 having a channel 760 in communication with a slot 765 similar to the slide mechanism 550 described above. Each side of the slide mechanism 750 further includes a U-shaped portion 770 formed by the top plate 755 and an L-shaped member 775. The U-shaped portion 770 is configured to receive a member of the deck 60.

FIGS. 13 and 15 show tie-down assembly 700*b* and tie-down assembly 700*c*, identical to the tie-down assembly 700*a* described above, disposed opposite and adjacent to one another. The tie-down assemblies 700*b* and 700*c* are coupled by carriage bolts 705 and fastening nuts 710 and miscellaneous washers to the slide mechanism 750. This configuration of tie-down assemblies 700*b* and 700*c* enhances convenience and reliability in securing loads on both sides of the trailer assembly 50.

Figure 16:
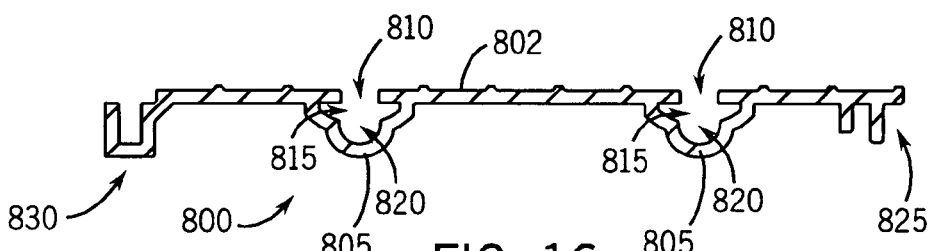
FIG. 16 is a cross-sectional view of an alternate plate from the slide mechanisms of the present invention.

FIG. 16 shows another embodiment of a slide mechanism 800 of the present invention. The slide mechanism 800 includes a plate 802 having multiple channels 805 in communication with respective multiple slots 810, similar to the slide mechanism 550 described above. However, the channel 805 is shaped differently than the channel 565 of slide mechanism 550. The channel 805 includes a first portion 815 shaped to receive a head of a carriage bolt (not shown), and a second portion 820 having a circular-shape that is generally as wide as the slot 810. The second portion 820 reduces friction and thereby enhances movement of the carriage bolt along the length of the channel 805 and slot 810. The edges of the plate 802 further include a male adapter 825 and/or a female adapter 830, similar to the female 455 and male adapters 460 described above. The male 825 and female 830 adapters can be switched, or have male adapters along both sides, or female adapters along both sides.

Figure 17:
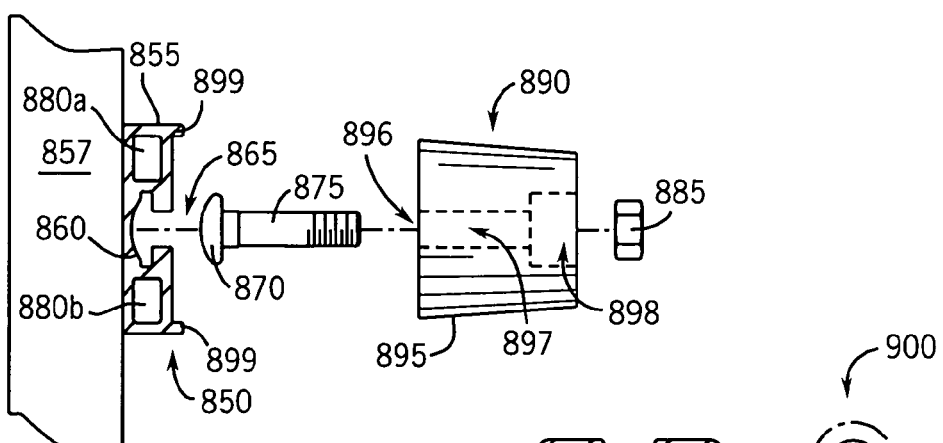
FIG. 17 is a cross-sectional view of a sixth embodiment of a slide mechanism in accordance with the present invention.

FIG. 17 shows another embodiment of a slide mechanism 850 of the present invention. The slide mechanism 850 includes a bunk pad 855 configured to mount along a vertical support 857. However, the position (e.g., vertical, horizontal, etc.) of the bunk pad 855 can vary. The bunk pad 855 includes a channel 860 in communication with a slot 865 similar to the slide mechanism 750 described above. The channel 860 and slot 865 are centrally disposed along a central axis of the pad 855, and configured to receive a head 870 of a carriage bolt 875, similar to the carriage bolt 705 described above. The pad 855 further includes interior passages 880*a* and 880*b* extending parallel to the channel and configured to reduce the weight of the slide mechanism.

Coupled by the carriage bolt 875 and a fastening nut 885 is another embodiment of a tie-down assembly 890 of the present invention. The tie-down assembly 890 includes a bumper with a tapered cylindrical portion 895 and a centrally disposed opening 896. The opening 896 includes a first portion 897 configured to receive the neck portion of the carriage bolt 875, and a second portion 898 configured to receive the fastening nut 885. The top and bottom portions of the pad can include extensions 899 from its end portions that are configured to receive the tie-down assembly 890 and to enhance the assembly's reliability and aesthetics. The composition (e.g., rubber, wood, plastic, etc.) of the bunk pad and bumper can vary.

Figure 18:
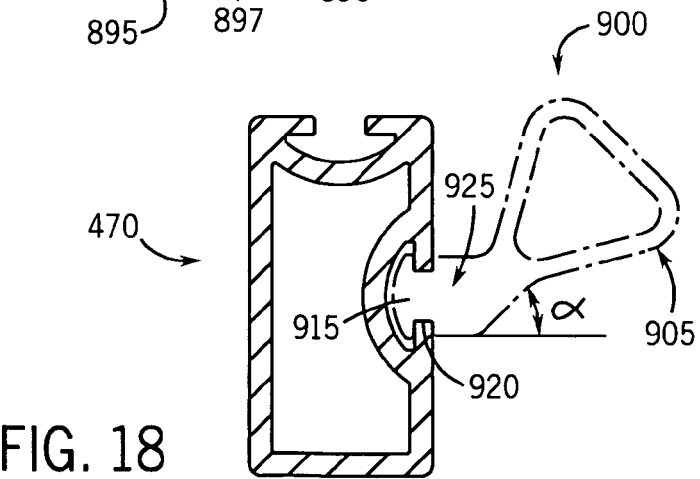
FIG. 18 is a cross-sectional view of a seventh embodiment of a slide mechanism in accordance with the present invention.

FIG. 18 shows another embodiment of the tie-down assembly 900 configured with the slide mechanism 470 of FIG. 7. The tie-down assembly 900 includes a loop portion 905 angled with respect to a base portion 910. The base portion 910 includes an integrated head portion 915 similar to the head 255 of the carriage bolt 250 described above. Adjacent to the head portion 915 is a neck portion 920 extending through the slot. The head 915 and neck 920 portions are configured to allow the tie-down assembly 900 to slidably travel along the length of the slide mechanism 470 similar to the tie-down assemblies described above. The head 915 and neck 920 portions are integrated with the tie-down assembly 900 such that a fastening nut is not required. An angled leg portion 925 couples the neck portion 920 with the loop portion 905. The angle (α) of the leg portion 925 can vary. The loop portion 905 includes a triangular shaped opening. The shape (e.g., square, circular, etc.) of the loop portion 905 can vary.

The above embodiments of slide mechanisms and tied down assemblies can be comprised of various materials (e.g., metal, rubber, plastic, wood, etc.) known in the art to be suitable for use on trailer assemblies. Furthermore, the support members integrated with the slot and the channel can be of various forms e.g., solid, hollow, perforated, etc. Furthermore, lengths of the above of the various slide mechanisms and tie-down assemblies can vary. For example, the slide mechanism can extend the entire length of a trailer, or a plurality of shorter segments can be selectively attached intermittently along the length of the trailer.

Furthermore, one or more embodiments of tie-down assemblies shown in the figures with a particular embodiment of slide mechanism in the figures can be interchangeably used with other embodiments of slide mechanisms shown in the figures. For example, the tie-down assembly shown in FIG. 5 can be used with the slide mechanism shown in FIG. 10. This interchangeable aspect of the tie-down assemblies with the slide mechanisms of the present invention enable numerous combinations to suit any load configuration within the limits of the overall trailer assembly. Furthermore, the number and combination of tie-down assemblies mounted on any embodiment of slide mechanism can vary. Furthermore, the various embodiments of tie-down assemblies and slide mechanisms shown in the figures can be used with various types of trailers e.g., flatbeds, watercraft trailers, etc.

Various modes of carrying out the invention are contemplated as being within the scope of the following claim particularly pointing out and distinctly claiming the subject matter, which is regarded as the invention.

I claim:

1. A slide mechanism for mounting a tie-down assembly on a trailer, comprising:
   an elongated member having an axial length and a box-shaped beam defining a hollow interior, the elongated member, including:
   a slot extending the axial length of the elongated member, the slot having a gap width; and
   a channel disposed parallel to and in communication with the slot, the channel having a width that exceeds the gap width of the slot; and
   a carriage bolt having a head and an elongated neck, the head having a width exceeding the gap width of the slot;
   wherein:
   the box shaped beam includes a top wall and a bottom wall, and a pair of side walls;
   the elongated member further includes an elongated rail portion extending vertically from and generally aligned with one of the side walls of the beam;
   the channel is configured to receive and maintain the carriage bolt head adjacent to the slot; and
   the carriage bolt neck is configured to couple the tie-down assembly to the slide mechanism.

2. The slide mechanism of claim 1, wherein the top wall of the elongated member includes the slot and the channel disposed therein.

3. The slide mechanism of claim 1, wherein the side wall of the box shaped beam includes the slot and the channel disposed along the side wall is aligned with the rail portion.

4. The slide mechanism of claim 1, wherein the elongated member includes a generally U-shaped plate having a first leg and a second leg and a top portion therebetween, and wherein a free end of each of the first leg and the second leg has a pair of winged end portions configured to couple with the trailer.

5. The slide mechanism of claim 4, wherein the slot and the channel are disposed along the top portion of the U-shaped plate.

6. The slide mechanism of claim 1, wherein the elongated member includes a vertical support disposed underneath the channel.

7. The slide mechanism of claim 1, wherein the elongated member includes a male adapter having a pair of downward extending lips.

8. The slide mechanism of claim 7, wherein the elongated member includes a female adapter having a generally U-shaped channel having a first leg coupled to the elongated member and a second leg, wherein the first and the second legs of the U-shaped channel are configured to receive one of the pair of downward extending lips of the male adapter, and wherein the pair of lips of the male adapter define a gap configured to receive the second leg of the U-shaped female adapter.

9. The slide mechanism of claim 1, wherein the elongated member includes a T-shaped vertical support disposed underneath the channel.

10. The slide mechanism of claim 1, wherein the slot is disposed along one of the side walls, and wherein the beam includes a first interior passage disposed between the channel and the top wall and a second interior passage disposed between the channel and the bottom wall.

11. The slide mechanism of claim 10, wherein the top and the bottom walls extend beyond the side wall to receive the tie-down assembly.

12. A trailer frame for transporting a load, the trailer frame supported on an axle and a pair of wheels, comprising:

a tie-down assembly configured to secure the load; and
a slide mechanism configured to slidably couple the tie-down assembly to the trailer frame, the slide mechanism including:
   an elongated member having an axial length, including:
      a slot extending the axial length of the elongated member, the slot having a gap width; and
      a channel disposed in communication with the slot, the channel having a width that exceeds the gap width of the slot; and
   a carriage bolt with a head having a width that exceeds the gap width of the slot;
wherein:
the channel is configured to maintain the carriage bolt head adjacent to the slot;
the carriage bolt is configured to receive the tie-down assembly; and
the tie-down assembly includes:
   a ring having a linear portion, and
   a mounting plate configured to couple the ring to the slide mechanism, the mounting plate including a raised portion configured to receive the linear portion of the ring and an opening to receive the carriage bolt.

13. The trailer frame of claim 12, wherein the tie-down assembly includes:
a side frame;
a pair of support arms, each arm having a first end coupled to the side frame and a second end;
a mounting plate having at least one opening configured to receive the carriage bolt of the slide mechanism;
a tube having a cylindrical surface integrated with the mounting plate; and
a pivot pin configured to couple the second end of the support arm to the tube and the mounting plate.

14. The trailer frame of claim 12, wherein the trailer frame includes a first side and a second side, and wherein the slide mechanism extends perpendicular with respect to the first and the second sides.

15. The trailer frame of claim 12, wherein the tie-down assembly includes:
a plate member having an angled portion coupled to a base portion, the base portion having at least one opening to receive a carriage bolt coupling the tied down assembly to the slide mechanism, and wherein the angled portion includes an opening and a rounded free end.

16. The trailer frame of claim 12, wherein the tie-down assembly includes a bumper having an opening to receive the carriage bolt of the slide mechanism.

17. The trailer frame of claim 12, wherein the elongated member of the slide mechanism is a bunk pad, and wherein the tie-down assembly includes a bunk coupled by the carriage bolt to the slide mechanism.

18. A slide mechanism for mounting a tie-down assembly on a trailer, comprising:
an elongated member having an axial length, including:
   a slot extending the axial length of the elongated member, the slot having a gap width; and
   a channel disposed parallel to and in communication with the slot, the channel having a width that exceeds the gap width of the slot; and
a carriage bolt having a head and an elongated neck, the head having a width exceeding the gap width of the slot;
wherein:
the channel includes a round-shaped portion configured to receive a round-shaped head portion of the carriage bolt and maintain the carriage bolt head adjacent to the slot; and
the carriage bolt neck is configured to couple the tie-down assembly to the slide mechanism.

19. A trailer frame for transporting a load, the trailer frame supported on an axle and a pair of wheels, comprising:
a tie-down assembly configured to secure a load; and
a slide mechanism configured to slidably couple the tie-down assembly to the trailer frame, the slide mechanism including:
   an elongated member having an axial length, including:
      a slot extending the axial length of the elongated member, the slot having a gap width; and
      a channel disposed in communication with the slot, the channel having a width that exceeds the gap width of the slot; and
   a carriage bolt with a head having a width that exceeds the gap width of the slot;
wherein:
the channel is configured to maintain the carriage bolt head adjacent to the slot;
the carriage bolt is configured to receive the tie-down assembly; and
the tie-down assembly includes a post coupled to an L-shaped mounting plate with an opening configured to receive the carriage bolt.

20. A trailer frame for transporting a load, the trailer frame supported on an axle and a pair of wheels, comprising:
a tie-down assembly configured to secure a load; and
a slide mechanism configured to slidably couple the tie-down assembly to the trailer frame, the slide mechanism including:
   an elongated member having an axial length, including:
      a slot extending the axial length of the elongated member, the slot having a gap width; and
      a channel disposed in communication with the slot, the channel having a width that exceeds the gap width of the slot; and
   a carriage bolt with a head having a width that exceeds the gap width of the slot;
wherein:
the channel is configured to maintain the carriage bolt head adjacent to the slot;
the slide mechanism is mounted along the side of the trailer frame;
the tie-down assembly includes a spare tire assembly having a mounting plate with at least one opening configured to receive the carriage bolt and slidably couple the tie-down assembly to the slide mechanism; and
the carriage bolt is configured to receive the tie-down assembly.

* * * * *